United States Patent
Angelo et al.

[19]

[11] Patent Number: 6,057,965

[45] Date of Patent: May 2, 2000

[54] LOW COST HIGH-SPEED PORTABLE IMAGING SYSTEM

[75] Inventors: Michael F. Angelo, Houston; William Whiteman, Cypress; Ramkrishna Prakash, Houston, all of Tex.

[73] Assignee: Compaq Computer Corporation, Houston, Tex.

[21] Appl. No.: 09/413,602

[22] Filed: Oct. 6, 1999

Related U.S. Application Data

[63] Continuation-in-part of application No. 09/226,453, Jan. 6, 1999.

[51] Int. Cl.[7] .................................................. G02B 27/10
[52] U.S. Cl. .................................................. 359/620
[58] Field of Search .................................. 359/315, 318, 359/578, 585, 620

[56] References Cited

U.S. PATENT DOCUMENTS 5,986,808  11/1999  Wang ...................................... 359/585

FOREIGN PATENT DOCUMENTS 11-25705  1/1999  Japan .

Primary Examiner—Ricky Mack
Attorney, Agent, or Firm—Paul N. Katz; Ronald L. Chichester; Frohwitter

[57] ABSTRACT

An improved system for scanning images is provided. The system includes a housing having a transparent support surface on which the document or other image being scanned is placed. The housing further contains an array of generally triangular-shaped prisms optically aligned. The array of prisms is coated with one of two types of electro-optical materials, one that makes the prisms reflective in the presence of an electromagnetic field and transparent in the absence of an electromagnetic field, and another that makes the prisms reflective in the absence of an electromagnetic field and transparent in the presence of an electromagnetic field. The electromagnetic field is created by applying a voltage across the coated prisms. A sequencer is used to activate individual electro-optical prisms so that the slices of the image can be reflected. By sequentially activating the electro-optical prisms, successive slices of the image can be presented to an image receptor disposed outside of the housing. A partially reflective mirror disposed within the housing redirects slices of the image reflected by the array of prisms into the image receptor. The system further includes a light source, which is disposed behind the partially reflective mirror outside of the housing. The light source is provided to illuminate the image being scanned. If the image receptor accepts digital input, the sequential images can be digitized for processing, storage and/or transmission.

38 Claims, 4 Drawing Sheets

LOW COST HIGH-SPEED PORTABLE IMAGING SYSTEM

CROSS REFERENCE TO RELATED PATENT APPLICATION

This application is a continuation-in-part of U.S. Ser. No. 09/226,453 filed on Jan. 6, 1999.

BACKGROUND OF THE INVENTION

Field of the Invention

The present invention is related to image scanning. More particularly, the present invention is related to a system for scanning images that does not require moving the scanning equipment such as the camera to acquire the image.

Description of The Related Technology

Optical or image scanners are devices that capture an image and store that image in computer memory for later reproduction, manipulation or other processing. Typically, such devices are constructed and operate as follows. The image, such as a document, photograph or is other similar image fixed in a medium, is placed on a transparent surface with the image oriented face down. The image is then covered by placing a light-reflecting surface over it, such as a white screen. The image is then illuminated by a light source located on the other side of the transparent surface. While the image is illuminated a camera is moved across the image taking photographs of the image as it traverses the image. The photographed images are converted into pixels, which in turn are stored in computer memory for later processing. In alternate designs, the camera is fixed, while the image is fed past the camera by use of one or more scrolling mechanisms.

In each of these designs, the image being scanned moves relative to the camera. The drawback of such designs is that they use mechanical components that move. Such devices tend to break down frequently and thus become somewhat expensive to maintain. These devices are also noisy, which is undesirable, especially in an office setting. Furthermore, because the image moves relative to the camera in these devices, the image captured, stored and ultimately reproduced is often blurred, and thus results in a low quality end product. Moreover, to minimize the blurring that occurs, these devices need to be operated at a slow speed, which makes these devices low output machines. These systems are also not easy to upgrade. Furthermore, the prior art devices are generally not readily portable.

There is, therefore, a need in the art for a portable system for scanning images quickly, cheaply and with little or no blurring.

SUMMARY OF THE INVENTION

The present invention solves the problems inherent in the prior art by providing a system for high speed scanning of images that produces a scanned image with little or no blurring.

In one aspect of the present invention, an imaging system including an array of prisms optically aligned (i.e., arranged such that light can pass between any two of the prisms in the array) is provided. In the preferred embodiment, the array of prisms is further arranged in a sawtooth pattern of alternating prisms and gaps. In this aspect of the present invention, each of the prisms has an electro-optical property that makes it reflective in the presence of an electromagnetic field and transparent in the absence of an electromagnetic field. The electromagnetic field is created by applying a voltage across the prisms. The system also includes an image receptor, e.g., a camera, which captures the image being scanned. The system further includes a sequencer, which applies a voltage across each prism in the array, so that when the sequencer sequentially applies and then removes an electromagnetic field from each prism, the image receptor captures sequentially different slices of the image.

The system further includes a partial mirror optically disposed between the array of prisms and the image receptor. The partial mirror redirects slices of the image reflected from the array of prisms toward the image receptor preferably at substantially a 90-degree angle. The imaging system also includes a light source that illuminates the image so that it can be captured by the image receptor. The imaging system further includes a housing that has a substantially flat support surface, which is transparent. The image to be scanned is placed on the support to surface. The partial mirror and the array of prisms are disposed within the housing. The light source and the camera are not.

In an alternate embodiment of the present invention, each of the prisms has an electro-optical property that makes it reflective in the absence of an electromagnetic field and transparent in the presence of an electromagnetic field. The prisms are made reflective/transparent according to the present invention by applying a coating having the desired properties.

In another alternate embodiment of the present invention, each of the prisms are made transparent or reflective by use of an array of integrated circuits, diode like devices, or other similar microchips that are attached to, embedded in or otherwise placed on the surface of the prisms. Each of said microchips has the property of being either transparent or reflective in response to a logic signal received from a processing unit, such as a central processing unit. Each of said microchips therefore has a plurality of pins, preferably at least two, for connection to the processing unit. The processing unit can send signals to all are part of the array of microchips so as to make each prism either transparent or reflective in accordance with the present invention.

In another aspect of the present invention, a method for scanning an image is provided. The method includes the steps of illuminating a slice of an image to be scanned and reflecting the slice of the image off of at least one prism in an array of prisms having an electro-optical property that makes the prisms reflective in the presence of an electromagnetic field and transparent in the absence of an electromagnetic field. The reflecting step is performed by applying a voltage across the at least one prism. The method further includes the step of capturing the slice of the image with an image receptor. In the preferred embodiment, these steps are repeated for different slices of the image until the entire image is captured. In this embodiment, the voltage is applied across different prisms during each iteration of the steps of the method. In the preferred method, the slice of the image is redirected off of a partial mirror optically disposed between the array of prisms and the image receptor at substantially a 90-degree angle.

In an alternate embodiment of the present invention, the step of reflecting the slice of the image off of at least one prism in an array of prisms is performed with prisms having an electro-optical property that make them reflective in the absence of an electromagnetic field and transparent in the presence of an electromagnetic field.

Other and further objects, features and advantages will be apparent from the following description of presently preferred embodiments of the invention, given for the purpose

DETAILED DESCRIPTION OF THE PREFERRED EMBODIMENTS

Figure 1:
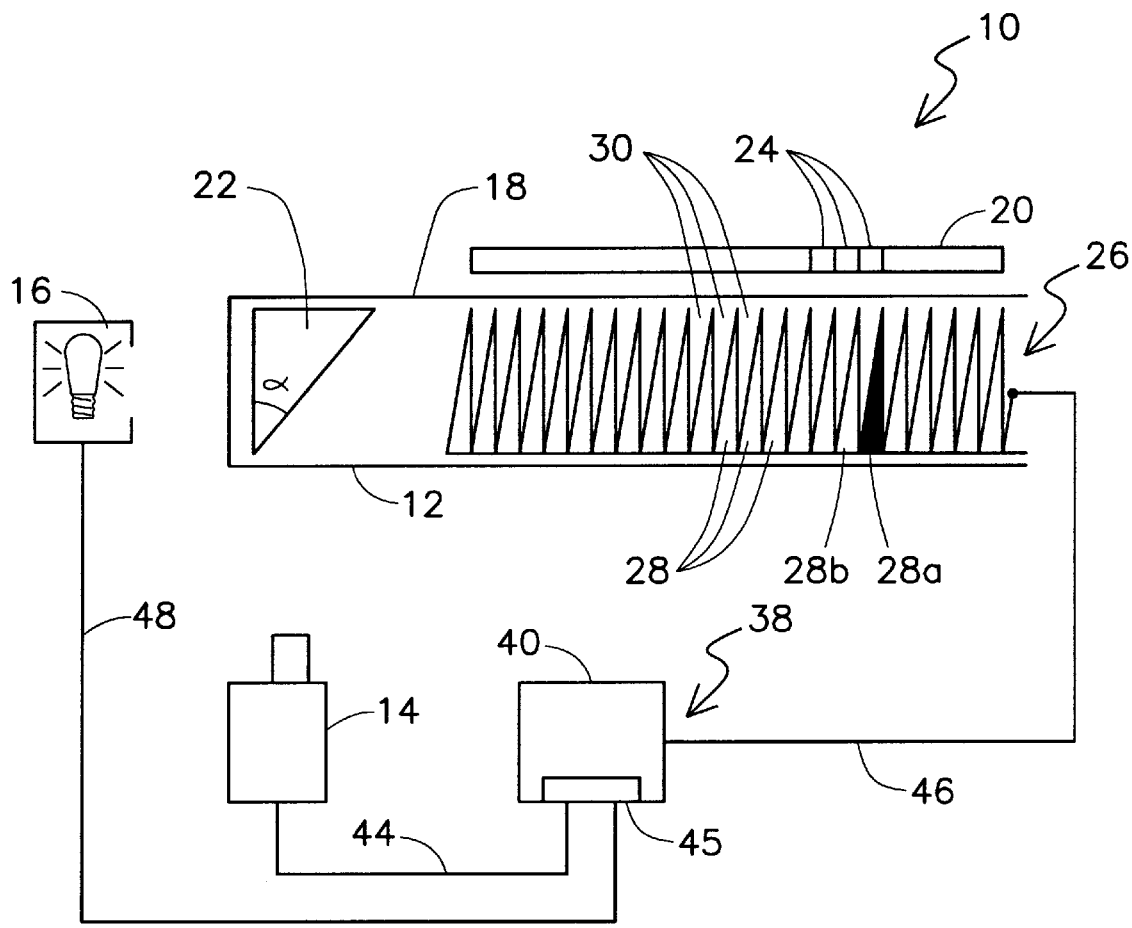
FIG. 1 is a schematic diagram of an imaging system according to the present invention.

Turning now to the drawings, a system for scanning images according to the present invention will be described. Referring to FIG. 1, the system for scanning images, also called the scanner, according to the present invention is shown generally by reference numeral 10. The scanner 10 includes a housing 12, an image receptor 14, and a light source 16. The housing 12 is a generally rectangular-shaped box, which is longer than it is wide, and wider than it is high. The housing 12 has a transparent support surface 18. The image to be scanned 20, in this case a flat sheet of paper, is placed on the transparent support surface 18. The image receptor 14 is preferably a single band charge coupled device (CCD) or conventional digital camera. The light source 16 is preferably a strobe light emitting white light.

A partial mirror 22 is disposed within the housing 12 at an end proximal to the light source 16. The partial mirror 22 is partially transparent and partially reflective, i.e., it permits light to pass through it and to be reflected off of it. In particular, light from the light source 16 passes through the partial mirror 22 while portions of the image 20 referred to as image slices 24 are reflected off of the partial mirror, as will be explained further below.

Figure 2:
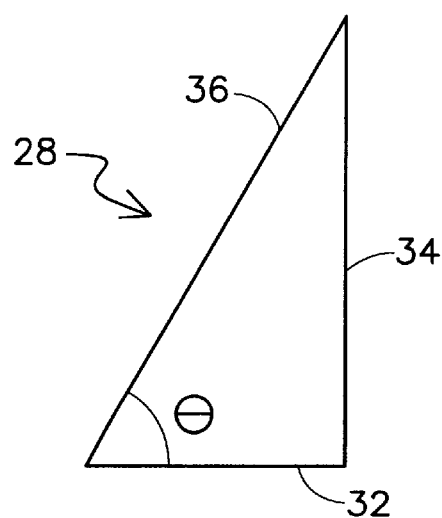
FIG. 2 is a side view of a prism utilized in the imaging system shown in FIG. 1.

An array of prisms 26 is also disposed within the housing 12. The array 26 includes a 19 plurality of prisms 28 aligned adjacent to one another in a sawtooth pattern of alternating teeth (prisms 28) and gaps 30. The structure of each prism 28 is shown in FIG. 2. As shown in FIG. 2, each prism 28 is triangular in shape. It has a base 32, an altitude 34, and a hypotenuse or sloped portion 36. The sloped portion 36 of the prism 28 acts as a reflector when activated with the appropriate electromagnetic field, as discussed below. The angle of the reflector 36, angle θ, as well as the length of the base 32, and the altitude 34, are such that, when the prism 28 is placed adjacent to a corresponding image slice 24, the image slice 24 is reflected off of the prism at an angle of approximately 90-degrees. Preferably, the angle θ is 45-degrees. It should be understood by those skilled in the art, however, that the above-described triangular shape is merely illustrated and that a wide range of other prism shapes, θ angles, and camera angles could be used with equal or better effect within the scope of the present invention.

Figure 3:
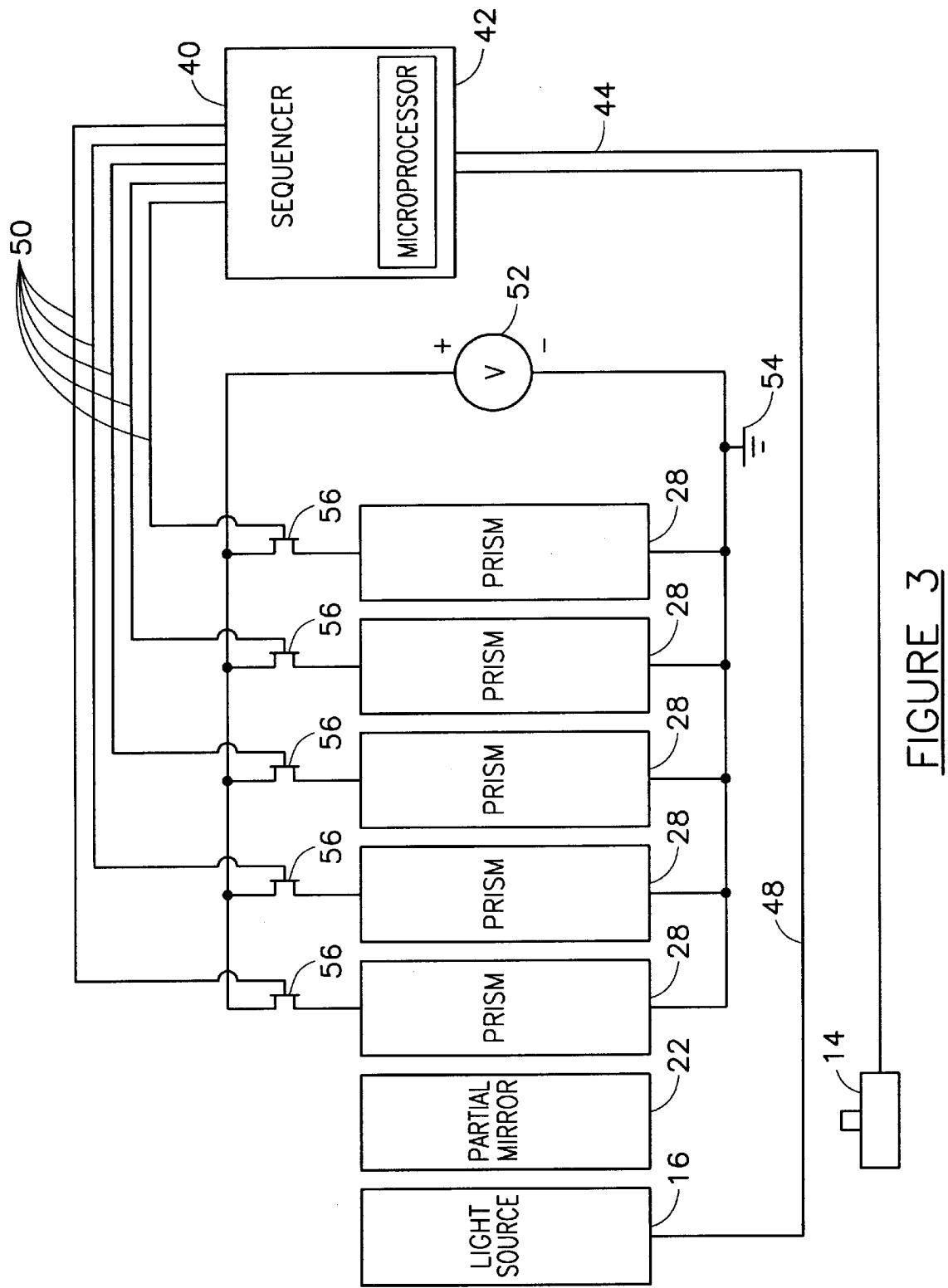
FIG. 3 is an electrical-schematic diagram of the imaging system shown in FIG. 1.

In the preferred embodiment, a control unit 38 is provided. The control unit 38 includes a sequencer 40 and an associated microprocessor 42. In FIG. 1, the control unit 38 is shown connected to the image receptor 14 by communication line 44. However, as those of ordinary skill in the art will appreciate, the control unit 38 can alternatively be incorporated into the image receptor 14. The control unit 38 is connected to the plurality of prisms by connector cord 46 and connected to the light source 16 by connector cord 48. The connector cord 46 in turn is made up of a plurality of leads 50 that connect the sequencer 40 to each of the prisms 28, as shown in FIG. 3.

The sequencer 40 is able to selectively place one or more of the prisms 28 under an electromagnetic field by generating, for example, a voltage across the prism itself. The prisms 28 are constructed of an electro-optical material that changes its reflective properties in the presence (or absence) of an electromagnetic field, such as the one generated by a voltage generator 52 (shown in FIG. 3) that is controlled by the sequencer 40. Specifically, the array of prisms 26 is made of an electro-optical material that changes its reflective properties in either the presence or absence of an electromagnetic field. The electromagnetic field can be induced by, for example, an electric current created by a voltage differential. The electro-optical material would become reflective when, for example, an electric current is run through it. The same material would be transparent in the absence of the electric current. An example of a material having these electro-optical properties is an electro-reactive substance such as a liquid crystal display (LCD) type coating. Preferably, the array of prisms 26 is coated with such a substance. FIG. 1 illustrates this embodiment of the present invention. In particular, the crosshatched prism labeled 28a indicates a prism that is made reflective in the presence of an electromagnetic field generated by the voltage generator 52.

Alternatively, another suitable electro-optical material can be used to coat the array of prisms 26, which is reflective in the absence of an electric current and transparent in the presence of an electric current. FIG. 1 also illustrates this embodiment of the present invention. In this case, an electric field is applied to all of the prisms 28 in the array 26 so as to make them transparent, except for the cross-hatched prism labeled 28a, which is reflective in the absence of the electromagnetic field created.

Essentially, the reflectiveness or transparency of the material used to coat the array of prisms 26 can be controlled by applying or removing an electromagnetic field or thermal gradient. This enables the reflectiveness or transparency of the array of prisms 26 to be set like a switch and can be controlled in the same manner with mechanisms well known in the art. Moreover, other suitable electro-optical materials may be activated thermally or by other methods in addition to, or in lieu of, being activated electrically without departing from the spirit of the present invention.

In the preferred method of operation, the light source 16 is activated by the microprocessor 42 to illuminate the image 20 being scanned and all but one of the prisms 28 in the array 26 is put in a non-reflective state by the sequencer 40. With reference to FIG. 1, prism 28a is put into a reflective state. With respect to the light from the light source 16, it passes through the partial mirror 22, the prisms 28 in the non-reflected state, and is then reflected off of the reflection-activated prism 28a toward the image 20 being scanned. A portion of the image 20, slice 24, is then transmitted back. Upon illumination, the image slice 24 is reflected off of the reflection-activated 20 prism 28a and passed through the other (reflection-deactivated) prisms 28 until the image reaches the partial mirror 22 where the image slice 24 is reflected at an angle of 90-degrees towards the image receptor 14. The image receptor 14 captures the image slice 24 for subsequent storage, processing and/or transmission by the microprocessor 42.

Once the first image slice 24 is obtained, the sequencer 40 then applies the electromagnetic field to the prism 28b adjacent to the first-activated prism 28a. Thus, a second image slice, covering a slightly different portion of the entire image 20, is reflected into the image receptor 14. This process of applying and then removing electromagnetic fields on the prisms 28 is repeated until the image receptor 14 has received a sufficient number of sequentially different images to comprise the entire image 20. The image slices 24 received by the image receptor 14 can then be processed and, with appropriate processing capability, a digital reproduction of one side of the image 20, such as a document, can be obtained.

Figure 4:
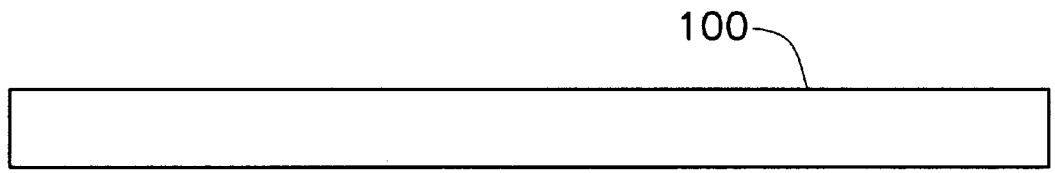
FIG. 4 illustrates a sheet of optically transparent material used in forming an array of prisms utilized in the imaging system shown in FIG. 1.
Figure 5:
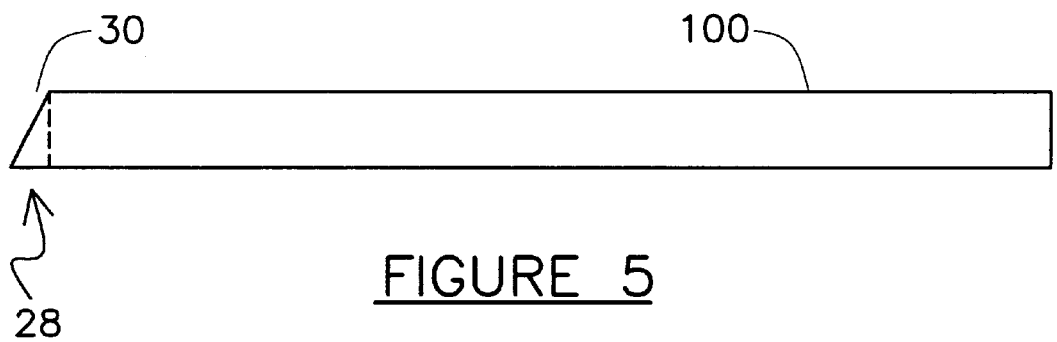
FIG. 5 illustrates the formation of one prism in the array of prisms utilized in the present invention.
Figure 6:
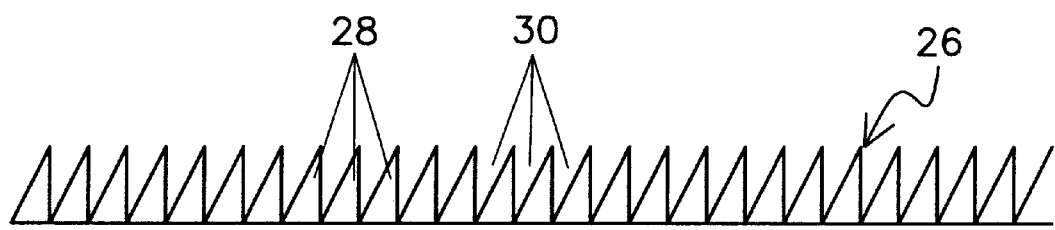
FIG. 6 illustrates the entire array of prisms after they have been milled according to the present invention.

The array of prisms 26 can be constructed in the following manner. First, a single sheet 100 of any optically transparent material, such as glass, plastic, or a fiber optic material, or the like, is laid on the work area of a milling device, as shown in FIG. 4. The milling device used must be capable of performing defraction grading sufficient to mill a gap 30 and thereby form a first prism 28, as shown in FIG. 5. The milling process is continued to form additional prisms 28 by milling additional gaps 30 into a sawtooth pattern of alternating teeth (prisms) and gaps to create the array of prisms 26, oriented as shown in FIG. 6. The array of prisms 26 must contain at least two prisms 28 and be constructed of an electro-optical material that changes its reflection properties when the intensity of an electromagnetic field in proximity to the prism is changed. The electromagnetic field can be induced (applied) by, for example, the voltage generator 52, or by other methods well known in the art. As discussed above, the electro-optical material of the array of prisms 20 can be of the type that makes the prism 28 reflect an image when the electromagnetic field is present and pass-through the image (i.e., be transparent) when the electromagnetic field is removed (i.e., the absence of an electromagnetic field). The electro-optical material of the second set of prisms can also be of the type that makes the prism 28 transparent in the presence of an electromagnetic field and to reflect an image in the absence of an electromagnetic field. While either scenario is equally useful to the present invention, these properties must be known before an object is scanned so that the sequencer 40 can be programmed in order to make the particular prism 28 reflective or transparent at the proper time.

Figure 7:
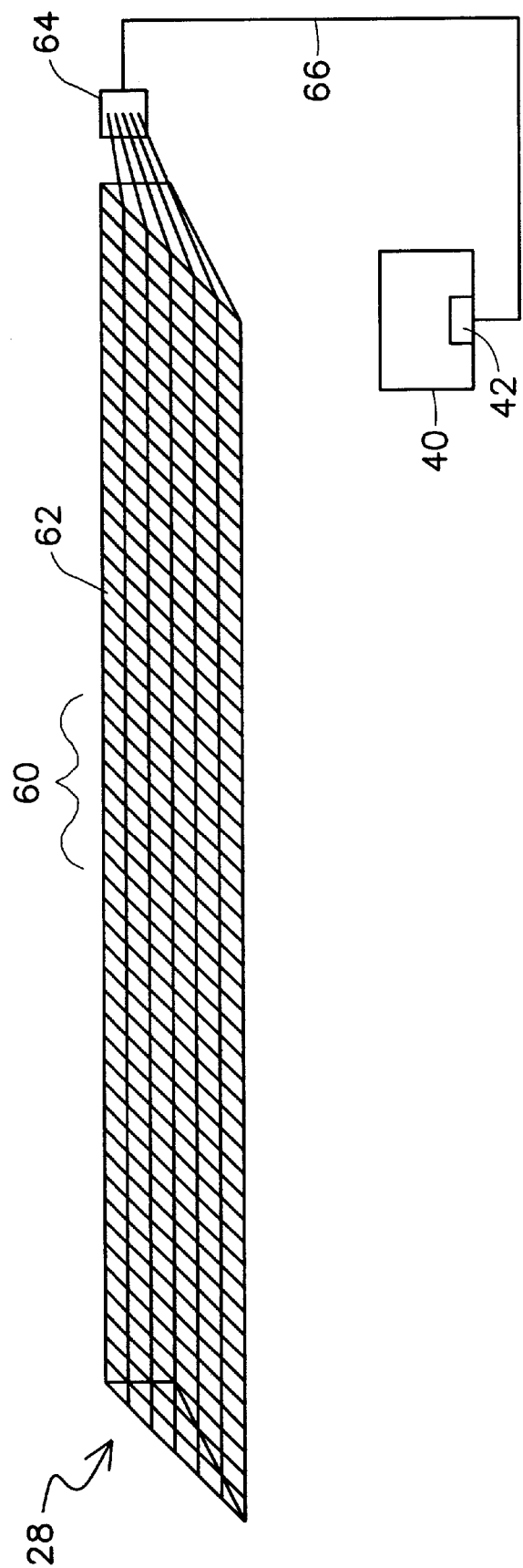
FIG. 7 illustrates an alternate embodiment of the present invention wherein the transparent/reflective surface of each prism is created by an array of microchips.

In an alternate embodiment of the present invention, each prism 28 is made both transparent and reflective by attaching to, embedding, or otherwise placing on its surface 36 an array 60 of integrated circuits, diode like devices, or other similar microchips 62, as shown in FIG. 7. Preferably, the microchips are Digital Micro-mirror Devices™ also known as DMDs™, which are manufactured by Texas Instruments, Inc. Each microchip 62 has the property that it can toggled between a transparent state and a reflective state in response to a logic signal received from a processing unit, in this case the microprocessor 42. Each microchip 62 has a plurality of pins, preferably at least two, which are joined to a connector 64, which in turn is connected to the microprocessor 42 via communication line 66. The microprocessor 42 instructs each of the individual microchips 62 in the array 60 to be either transparent or reflective depending upon whether or not the particular prism 28 is in a scanning mode or not as described herein.

The microchips 62 can be secured to the prisms 28 by mounting techniques known in the art, or alternatively they can be embedded in the prisms 28 themselves. In the latter method, the surface 36 of the prism 28 serves as the substrate for the microchips 62 during their formation. Common lithography techniques are then used to form the circuitry of the microchips 62 on the substrate surface 36.

Once the array of prisms 26 is constructed, it is placed in the housing 12, which itself is constructed by forming a box having a generally rectangular support surface 18 for the image 24 being scanned. The support surface 18 is formed of an optically transparent material, such as, e.g., glass or plexi-glass. The partial mirror 22 is also installed in the housing 12. Preferably the array of prisms 26 and the partial mirror 22 are installed in the housing 12 before the support surface 18 is put into place.

Each of the prisms 28 is connected to the sequencer 40, as shown in the electrical schematic of FIG. 3. Referring to FIG. 3, each of the prisms 28 are connected to a ground 54 at one end. On the opposite end from the ground connect, a switch 56 is attached to each prism 28. The switch 56 may be any switch that satisfies the power loads and switching speed requirements. Suitable switches 56 can be FETs, JFETs, MOSFETs or other semiconductor devices known in the art. Although slow and bulky, relays and other similar devices could also be used in this capacity with the present invention. The only requirements of the switch 56 are that they be controllable by the sequencer 40 and act quickly enough to allow the proper sequencing of images within the desired period of time. The only requirement of the sequencer 40 is that it be able to selectively apply and remove the triggering means (e.g., an electromagnetic field or thermal gradient) to each prism 28 in the array 26 that must to be made reflective or transparent in order to obtain the desired number of images from the object in question.

The switches 56 that are connected to the prisms 28 are also connected both to the positive side of the voltage generator 52 and to the sequencer 40 via leads 50. The sequencer 40 includes the microprocessor 42 that controls the sequencing of events. Alternatively, the microprocessor 42 could be embedded within a separate device (not shown) or within the image receptor 14. If the microprocessor 42 is located elsewhere, the sequencer 40 receives sequence instructions from the other device, thereby allowing synchronized imaging that minimizes the amount of time to scan an object, or to maximize the quality of the image obtained. Consequently, the image receptor 14 may contain a number of option features. However, the only requirement of the image receptor 14 is that it be able to receive images reflected from at least one of the prisms 28.

In an alternate embodiment according to the present invention, the housing 12 is flexible. A flexible housing 12 allows the present invention to be bent and/or folded for portability and allows for scanning of flat or substantially flat (i.e., not completely flat) objects. In the case of a substantially flat object, the prism housing 12 can be laid on the object to help flatten it out (not shown), or the housing 12 can be flipped over and the object laid upon it, as shown in FIG. 1.

It should be noted that the present invention does not need moving parts, such as positioning motors, as are required in the prior art devices. The present invention therefore provides a lower maintenance device. The present invention also does not suffer from the blurring problem incumbent with the use of positioning devices. In addition, the solid-state nature of the present invention allows for the near real-time data (image) acquisition. Furthermore, the present invention allows for faster repositioning of images as well as faster scaling and translation. Moreover, the present invention provides a device that can have variable degrees of resolution. For example, by increasing the number of prisms in the array 26, a finer resolution is possible. Indeed, the present invention includes a device that incorporates multiple arrays of prisms or screens to enable the user to choose from various degrees of resolution. Another way to achieve this result, i.e., various degrees of resolution, is to vary the angle in which the partial mirror is oriented, i.e., to vary the angle α. The larger angle α is, the more of image slice 24 is transmitted to the image receptor 14, and thus the greater the resolution. Similarly, the smaller angle α is, the less of image slice 24 is transmitted to the image receptor 14, and thus the lesser the resolution.

The present invention, therefore, is well adapted to carry out the objects and attain both the ends and the advantages mentioned, as well as other benefits inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An imaging system comprising:
   (a) an array of prisms optically aligned, each prism in said array having an electro-optical property that makes it reflective in the presence of an electromagnetic field and transparent in the absence of an electromagnetic field, said electromagnetic field being created by the application of a voltage across the prism;
   (b) an image receptor adapted to capture an image reflected from the array of prisms; and
   (c) a sequencer adapted to apply a voltage across each prism in said array, such that when said sequencer sequentially applies and then removes a voltage from each prism said image receptor captures sequentially different slices of the image.

2. The imaging system according to claim 1, further comprising a partial mirror optically disposed between the array of prisms and the image receptor, said partial mirror redirecting slices of the image reflected from the array of prisms toward the image receptor.

3. The imaging system according to claim 2, wherein the partial mirror redirects the slices of the image reflected from the plurality of prisms toward the image receptor at substantially a 90-degree angle.

4. The imaging system according to claim 2, further comprising a light source that illuminates the image so that it can be captured by the image receptor.

5. The imaging system according to claim 4, wherein the array of prisms direct light from the light source onto the image so as to illuminate it.

6. The imaging system according to claim 5, wherein the light source is disposed behind the partial mirror and light from the light source passes through the partial mirror and is projected onto the image by the array of prisms.

7. The imaging system according to claim 1, wherein each prism in the array is identical in shape and has an LCD coating.

8. The imaging system according to claim 1, wherein the image receptor includes a camera.

9. The imaging system according to claim 1, further comprising a housing having a support surface that is transparent and adapted to maintain the image in a substantially flat position.

10. The imaging system according to claim 1, wherein the array of prisms is further arranged in a sawtooth pattern of alternating prisms and gaps.

11. An imaging system comprising:
    (a) an array of prisms optically aligned, each prism in said array having an electro-optical property that makes it transparent in the presence of an electromagnetic field and reflective in the absence of an electromagnetic field, said electromagnetic field being created by the application of a voltage across the prism;
    (b) an image receptor adapted to capture an image reflected from the array of prisms; and
    (c) a sequencer adapted to apply a voltage to each prism in said array, such that when said sequencer sequentially removes and then applies a voltage to each prism said image receptor captures sequentially different slices of the image.

12. The imaging system according to claim 11, further comprising a partial mirror optically disposed between the array of prisms and the image receptor, said partial mirror redirecting slices of the image reflected from the array of prisms toward the image receptor.

13. The imaging system according to claim 12, wherein the partial mirror redirects the slices of the image reflected from the array of prisms toward the image receptor at substantially a 90-degree angle.

14. The imaging system according to claim 12, further comprising a light source that illuminates the image so that it can be captured by the image receptor.

15. The imaging system according to claim 14, wherein the array of prisms direct light from the light source onto the image so as to illuminate it.

16. The imaging system according to claim 15, wherein the light source is disposed behind the partial mirror and light from the light source passes through the partial mirror and is projected onto the image by the array of prisms.

17. The imaging system according to claim 11, wherein each prism in the array is identical in shape.

18. The imaging system according to claim 11, wherein the image receptor includes a camera.

19. The imaging system according to claim 11, further comprising a housing having a support surface that is transparent and adapted to maintain the image in a substantially flat position.

20. The imaging system according to claim 11, wherein the array of prisms is further arranged in a sawtooth pattern of alternating prisms and gaps.

21. An imaging system comprising:
    (a) an array of prisms optically aligned, each prism in said array having a surface with an array of microchips, each microchip adapted to be transparent in response to one logic signal and reflective in response to another logic signal;
    (b) an image receptor adapted to capture an image reflected from the array of prisms; and
    (c) a microprocessor connected to each microchip of each prism in said array, said microprocessor sequentially activating each array of microchips of each prism so that said image receptor captures sequentially different slices of the image.

22. The imaging system according to claim 21, further comprising a partial mirror optically disposed between the array of prisms and the image receptor, said partial mirror redirecting slices of the image reflected from the array of prisms toward the image receptor.

23. The imaging system according to claim 22, wherein the partial mirror redirects the slices of the image reflected from the plurality of prisms toward the image receptor at substantially a 90-degree angle.

24. The imaging system according to claim 22, further comprising a light source that illuminates the image so that it can be captured by the image receptor.

25. The imaging system according to claim 24, wherein the array of prisms direct light from the light source onto the image so as to illuminate it.

26. The imaging system according to claim 25, wherein the light source is disposed behind the partial mirror and light from the light source passes through the partial mirror and is projected onto the image by the array of prisms.

27. The imaging system according to claim 21, wherein each prism in the array of prisms is identical in shape.

28. The imaging system according to claim 21, wherein the image receptor includes a camera.

29. The imaging system according to claim 21, further comprising a housing having a support surface that is transparent and adapted to maintain the image in a substantially flat position.

30. The imaging system according to claim 21, wherein the array of prisms is further arranged in a sawtooth pattern of alternating prisms and gaps.

31. A method for scanning an image comprising the steps of:

(a) illuminating a slice of an image to be scanned;

(b) reflecting the slice of the image off of at least one prism in an array of prisms having an electro-optical property that makes the prisms reflective in the presence of an electromagnetic field and transparent in the absence of an electromagnetic field, said electromagnetic field being created by applying a voltage across the prisms, said reflecting step being performed by applying a voltage across said at least one prism in the array; and (c) capturing the slice of the image with an image receptor.

32. The method for scanning an image according to claim 31, further comprising the steps of repeating steps (a) through (c) for different slices of the image until the entire image is captured, and wherein the voltage is applied across different prisms during each iteration of steps (a) through (c).

33. The method for scanning an image according to claim 31, further comprising the step of redirecting the slice of the image off of a partial mirror optically disposed between the array of prisms and the image receptor.

34. The method for scanning an image according to claim 33, wherein the slice of the image is redirected off of the partial mirror at substantially a 90-degree angle.

35. A method for scanning an image comprising the steps of:

(a) illuminating a slice of an image to be scanned;

(b) reflecting the slice of the image off of at least one prism in an array of prisms having an electro-optical property that makes the prisms reflective in the absence of an electromagnetic field and transparent in the presence of an electromagnetic field, said electromagnetic field being created by applying a voltage across the prisms, said reflecting step being performed by removing the voltage applied across at least one of the prisms in the array; and (c) capturing the slice of the image with an image receptor.

36. The method for scanning an image according to claim 35, further comprising the steps of repeating steps (a) through (c) for different slices of the image until the entire image is captured, and wherein the voltage is removed from different prisms during each iteration of steps (a) through (c).

37. The method for scanning an image according to claim 35, further comprising the step of redirecting the slice of the image off of a partial mirror optically disposed between the array of prisms and the image receptor.

38. The method for scanning an image according to claim 37, wherein the slice of the image is redirected off of the partial mirror at substantially a 90-degree angle.

* * * * *